Figure 1:
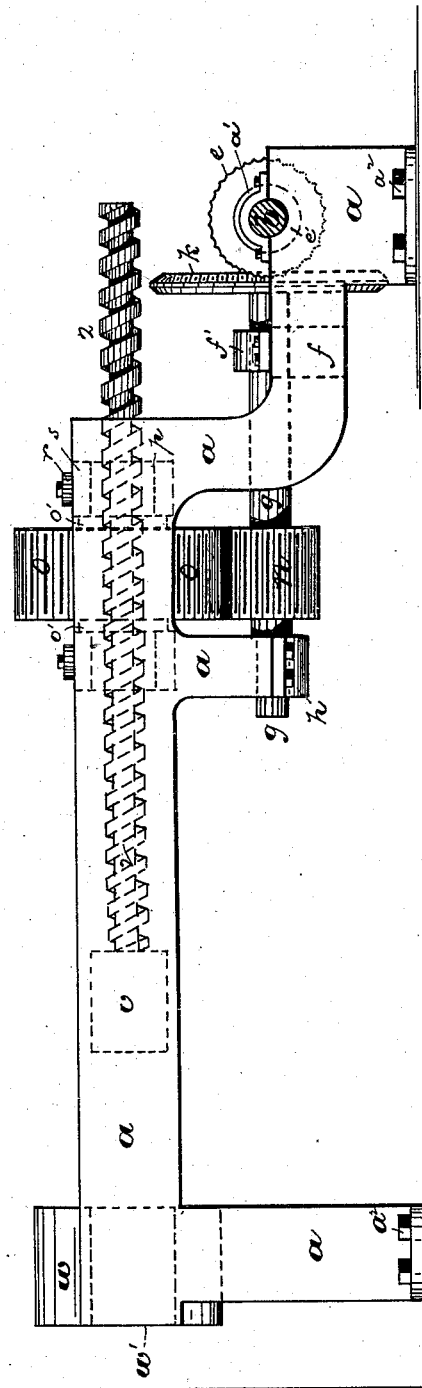

(No Model.)   J. M. RILEY.   3 Sheets—Sheet 1.
TUBE OR PIPE MACHINE.

No. 416,858.   Patented Dec. 10, 1889.

WITNESSES:   INVENTOR:
Alfred Gartner
E. L. Sherman   John M. Riley,
BY Drake & Co. ATTY'S.

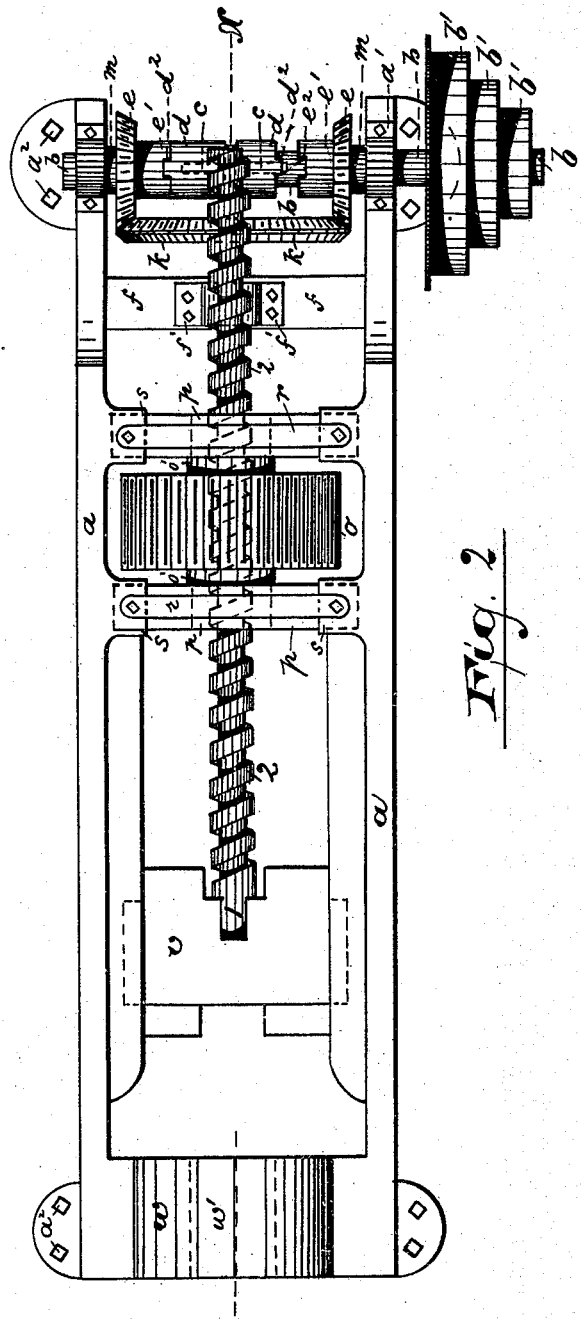

(No Model.) 3 Sheets—Sheet 3.
J. M. RILEY.
TUBE OR PIPE MACHINE.
No. 416,858. Patented Dec. 10, 1889.
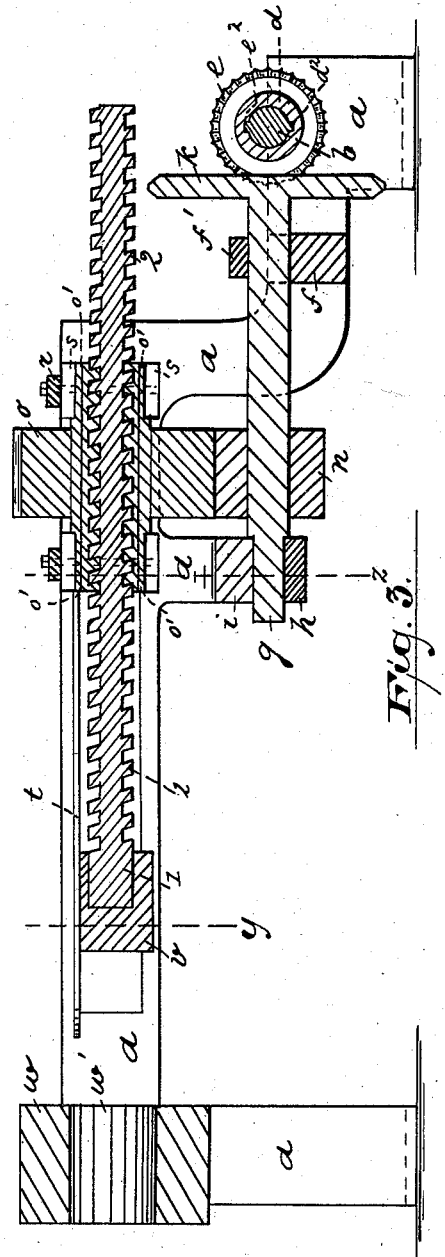
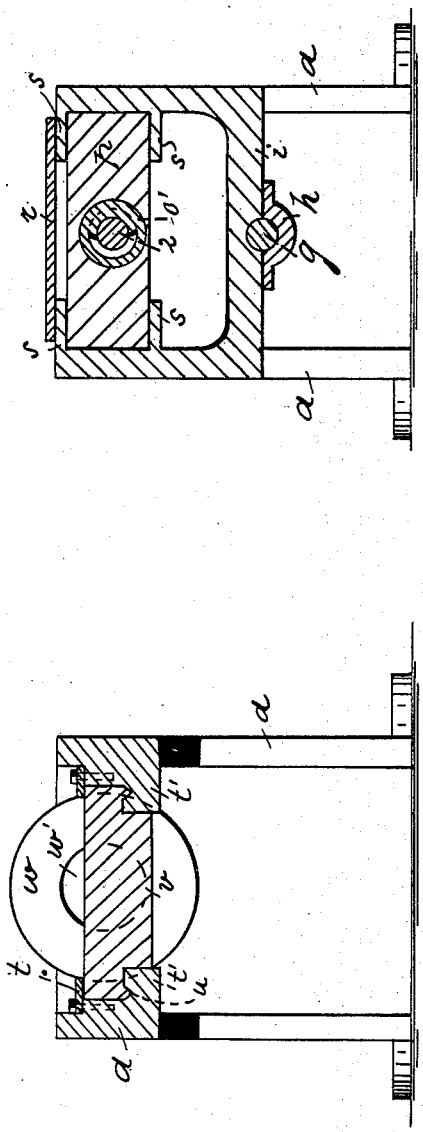
WITNESSES:
Alfred Gartner
E. L. Sherman
INVENTOR:
John M. Riley,
BY Drake & Co. ATTY'S.

UNITED STATES PATENT OFFICE.

JOHN M. RILEY, OF NEWARK, NEW JERSEY.

TUBE OR PIPE MACHINE.

SPECIFICATION forming part of Letters Patent No. 416,858, dated December 10, 1889.

Application filed February 9, 1889. Serial No. 299,289. (No model.)

*To all whom it may concern:*

Be it known that I, JOHN M. RILEY, a citizen of the United States, residing at Newark, in the county of Essex and State of New Jersey, have invented certain new and useful Improvements in Tube or Pipe Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to a machine for making pipes or tubes out of solid blanks of metal, and has for its object increased efficiency and simplicity of construction, with ease of operation.

The invention consists, chiefly, in having the screw-press shaft made rigid, and movable only in a longitudinal direction, and in the combination and arrangement of the various parts of the machine, as will be hereinafter set forth, and finally embodied in the clauses of the claim.

Referring to the accompanying drawings, in which like letters of reference indicate corresponding parts in each of the several figures, Figure 1 is a front elevation of a screw-press, partly in section, with the driving-pulleys removed and embodying my improvement. Fig. 2 is a top plan view of the same. Fig. 3 is a section through line $x$, Fig. 2. Fig. 4 is a section through line $y$, Fig. 3; and Fig. 5 is a section through line $z$, Fig. 3.

In said drawings, $a$ represents the bed or frame of a screw-press machine secured to the floor by bolts $a^2$ $a^2$ or any suitable means. In one end of the frame are bearings $a'$ $a'$, in which is adapted to rotate a main driving-shaft $b$, having on one of its ends driving-pulleys $b'$. (Shown in Fig. 2.) On said shaft and between the bearings are longitudinal lugs $c c$, made integral therewith. $d$ is a sleeve or clutch on said shaft, provided with slots $d'$ $d'$ to receive the lugs $c$ and slide longitudinally thereon, as shown in Figs. 2 and 3. On the ends of the sleeve or clutch are shoulders or projections $d^2$ $d^2$, Fig. 2. On said shaft are loosely arranged two bevel gear-wheels $e$ $e$, with hubs $e'$ $e'$ on their inner surface made integral therewith or rigidly secured thereto. On the ends of the two hubs are sockets or recesses $e^2$ $e^2$, adapted to receive the shoulders $d^2$ on the sleeve or clutch, as shown in Fig. 2.

In the rear of the main driving-shaft is a cross-piece $f$, extending between the sides of the frame, as shown in Fig. 2. On the top of this cross-piece are bearings $f'$, in which revolves a shaft $g$, Fig. 3, located at right angles to the main driving-shaft $b$. The rear end of this shaft $g$ is journaled in bearings $h$ on cross-bar $i$. (Shown in Figs. 1, 3, and 5.)

On the forward end of the shaft $g$ is secured a beveled gear-wheel $k$, meshing into both the gear-wheels $e$ on the main shaft. These gear-wheels $e$ are prevented from being pushed outward by the gear-wheel $k$ by the shoulders $m$ on the main shaft, against which they are pressed. On this shaft $g$ is secured a pinion-wheel $n$, meshing into cog-wheel $o$, with hubs $o'$ $o'$ on each side, Figs 1, 2, and 3. This cog-wheel $o$, with its hubs, has a central cylindrical opening, the wall of which is spirally threaded, as shown in Figs. 1 and 2. These hubs are arranged to rotate in bearings $p$ $p$, secured to cross-bars $r$ $r$, firmly bolted or secured to inwardly-projecting lugs $s$ $s$ on the frame $a$.

Upon the inner sides of the frame are longitudinal projections $t'$ $t'$, having beveled slots $u$ $u$ on their upper surface to receive a corresponding beveled projection in the shoulder of a cross-head or follower $v$, as clearly shown in Fig. 4. Upon the rear of the frame is a round base $w$, with cylindrical openings $w'$ for holding and supporting a bolster for holding tools.

The forward end of the cross-head or follower is formed with a false nose for the purpose of holding a punch or triplet.

In the cross-head or follower is formed a square recess or rectangular slot, in which is fitted and secured the rectangular end 1 of a press-screw 2. This press-screw is provided with spiral threads corresponding with the spiral thread on the inside of the cog $o$, on and in which the press-screw rests.

In the drawings I have shown the machine as constructed and adapted for pipe or tube work; but it can be adapted for many other purposes, as is manifest.

In operation the pipe or piece to be operated on by the former or shaper adjusted in the follower is first placed in position through the openings in the cylinder $w$. The sleeve or clutch is then brought up in close contact with one of the beveled gear-wheels $e$, according to the direction the shaft is driven. This leaves the other gear-wheel $e$ loose on the shaft. Power is then applied to the driving-pulleys on the main shaft. This causes the gear with which the sleeve or clutch is connected to revolve with the shaft, while the other gear being loose on the shaft can revolve in the opposite direction. The gear-wheel revolving with the shaft imparts its motion to the beveled gear-wheel $k$, causing the shaft $g$ to revolve, and with it the pinion $n$, which in turn transmits motion to the cog-wheel $o$, as will be understood. The cog-wheel $o$, having a central opening and spirally threaded on its wall in which the press-screw rests, as heretofore described, causes the press-screw to advance or recede, according to the direction of motion given to the cog-wheel, without any rotary motion being given to the press-screw, it being held securely in a fixed position in the follower, as shown. This rigid arrangement of the press-screw and the mode of imparting power to cause it to advance or recede allows of a steady, quick, and prompt action in pressing objects, and at the same time simplifies the operation. To change the direction of motion of the press-screw, the sleeve or clutch is withdrawn from the gear with which it has been in contact and slipped on the shaft and put in contact with the other gear-wheel. This gives a reverse motion to the press-screw, as will be manifest.

Having thus described my invention, what I claim as new, and desire to secure by Letters Patent, is—

1. In a pipe-machine, the combination, with the frame of the machine and a press-screw shaft provided with a cross-head, of a gear-wheel provided with spiral threads on its inner center, in which said press-screw rests, a pinion-wheel meshing into the outer periphery of said gear-wheel, a shaft parallel to said press-screw and to which said pinion is secured, provided at one end with a geared wheel, and means for transmitting motion from the main driving-shaft to the gear-wheel on said pinion-shaft, as and for the purpose set forth.

2. In a pipe-machine, the combination, with the main driving-shaft and press-screw shaft, of a loose beveled gear-wheel on said driving-shaft, provided with a hub, recesses in said hub, an adjustable clutch or sleeve on said driving-shaft and provided with lugs adapted to enter the recesses in said hub, of the beveled gear-wheel, and a shaft $g$ at right angles to the main driving-shaft and having a beveled gear on one end to mesh into the loose beveled gear on the main driving-shaft, the other end of said shaft $g$ being provided with means to operate the press-screw shaft, as described, and for the purpose set forth.

3. In a pipe-machine, the combined means herein described for imparting a forward and backward movement to the press-screw shaft, consisting of two beveled gear-wheels on main driving-shaft of the machine, and a clutch or sleeve on said main shaft to engage with one of said beveled gear-wheels in the forward movement of the press-screw and with the other beveled gear-wheel in the backward movement of said press-screw, both said beveled gear-wheels being arranged and adapted to mesh into a beveled gear-wheel secured to one end of a shaft transmitting motion to said press-screw, all said parts being arranged and combined as described, and for the purpose set forth.

In testimony that I claim the foregoing I have hereunto set my hand this 6th day of February, 1889.

JOHN M. RILEY.

Witnesses:
OLIVER DRAKE,
E. L. SHERMAN.